United States Patent
Tanaka

(10) Patent No.: US 7,690,261 B2
(45) Date of Patent: Apr. 6, 2010

(54) ULTRASONIC DIAGNOSIS SYSTEM AND TESTING METHOD

(75) Inventor: Toshizumi Tanaka, Saitama (JP)

(73) Assignee: Fujinon Corporation, Saitama-shi, Saitama (JP)

(*) Notice: Subject to any disclaimer, the term of this patent is extended or adjusted under 35 U.S.C. 154(b) by 352 days.

(21) Appl. No.: 11/723,692

(22) Filed: Mar. 21, 2007

(65) Prior Publication Data
US 2007/0220980 A1    Sep. 27, 2007

(30) Foreign Application Priority Data
Mar. 22, 2006    (JP)    ............... 2006-079534

(51) Int. Cl.
*G01N 29/00*    (2006.01)
*A61B 8/00*    (2006.01)

(52) U.S. Cl. ............. 73/649; 73/626; 73/628; 73/633; 600/437; 600/440

(58) Field of Classification Search .......... 73/649, 73/626, 628, 633; 600/437, 443, 447, 459, 600/460
See application file for complete search history.

(56) References Cited

U.S. PATENT DOCUMENTS

| | | | | |
|---|---|---|---|---|
| 4,674,516 A | * | 6/1987 | Hirota et al. ............. | 600/447 |
| 5,744,898 A | * | 4/1998 | Smith et al. .............. | 310/334 |
| 6,436,040 B1 | * | 8/2002 | Collamore et al. ......... | 600/437 |
| 6,685,637 B1 | * | 2/2004 | Rom ....................... | 600/437 |
| 6,719,693 B2 | * | 4/2004 | Richard ................... | 600/437 |
| 2008/0208046 A1 | * | 8/2008 | Pierce .................... | 600/437 |
| 2008/0225639 A1 | * | 9/2008 | Hongou ................... | 367/13 |

FOREIGN PATENT DOCUMENTS

JP    61-131732 A    6/1986

* cited by examiner

*Primary Examiner*—Hezron Williams
*Assistant Examiner*—J M Saint Surin
(74) *Attorney, Agent, or Firm*—Birch, Stewat, Kolasch & Birch, LLP

(57) ABSTRACT

An ultrasonic diagnosis system includes an ultrasonic probe, which has an array of plural ultrasonic transducer elements, for transmitting an ultrasonic wave to an object, and for receiving an echo signal thereof to output a detection signal. A testing unit sets a testing mode, and operates in test operation of the plural ultrasonic transducer elements while the testing mode is set, so as to acquire a testing detection signal. There is a display panel. A display control unit controls the display panel to display information of the testing detection signal obtained for each of the ultrasonic transducer elements. Furthermore, the testing unit, when in a first inspection, drives the ultrasonic transducer elements together to obtain the testing detection signal, and when in a second inspection, drives the ultrasonic transducer elements by at least one element to obtain the testing detection signal.

27 Claims, 5 Drawing Sheets

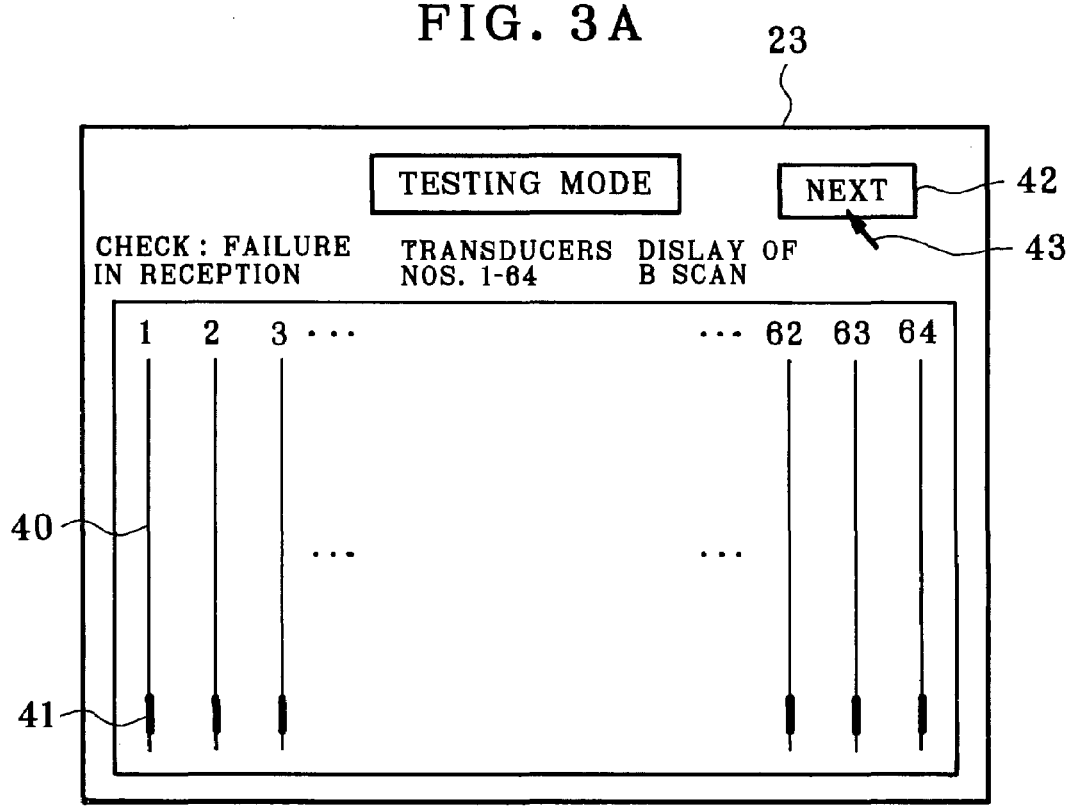
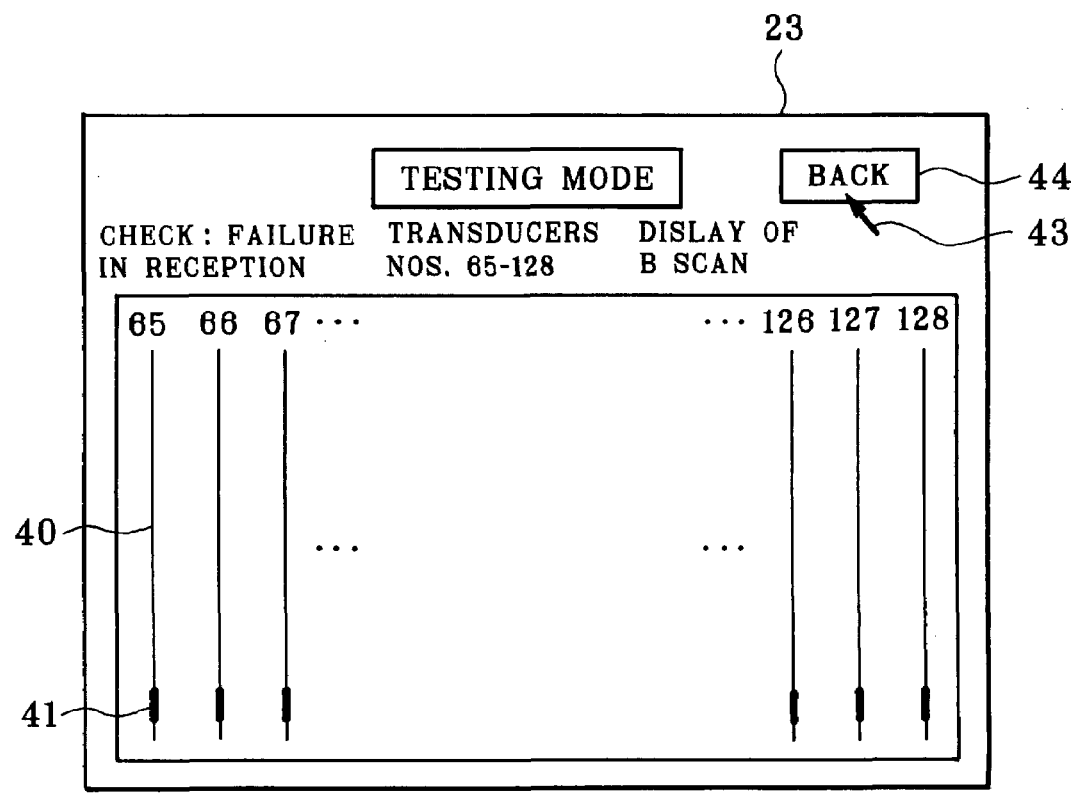

ULTRASONIC DIAGNOSIS SYSTEM AND TESTING METHOD

BACKGROUND OF THE INVENTION

1. Field of the Invention

The present invention relates to an ultrasonic diagnosis system and testing method. More particularly, the present invention relates to an ultrasonic diagnosis system in which operation of an ultrasonic transducer array can be tested correctly and efficiently, and testing method for the same.

2. Description Related to the Prior Art

In the field of medical techniques, imaging of an ultrasonic image has been widely utilized for diagnosis. An ultrasonic probe includes ultrasonic transducer elements for oscillation arranged regularly. An ultrasonic wave is emitted to an object or body surface of a human body. Then the ultrasonic transducer elements receive an echo signal from the object or body surface, and generate a detection signal. A processor electrically processes the detection signal to output the ultrasonic image.

Various types of ultrasonic imaging are known. In a mechanical scanning type, the ultrasonic transducer elements mechanically rotate, swing or slide. Also, an electronic scanning type has an ultrasonic transducer array in which the ultrasonic transducer elements are arranged on one line, and has an electronic switch to change over the ultrasonic transducer elements to be driven selectively. The ultrasonic wave is applied to the object or body surface for scanning to obtain the ultrasonic image of ultrasonic tomography which is referred to as a B scan image (brightness scan image).

If failure occurs in normal operation of the ultrasonic transducer elements due to breakage with disconnection of wiring, wrong wiring or short-circuiting, image quality of the ultrasonic image is lowered to make diagnosis incorrect. JP-A 61-131732 discloses an ultrasonic diagnosis apparatus in which computer programs are stored in a memory. Those programs are used to control a switching unit, a pulser, a receiver and other element for transmission and reception, the switching unit switching transmission and reception of the ultrasonic wave of the ultrasonic transducer elements, the pulser generating an excitation pulse and sending it to the ultrasonic transducer elements to emit the ultrasonic wave, the receiver receiving a detection signal from the ultrasonic transducer elements. The programs are started up by operation of a user such as a physician to diagnose a patient.

A new conception of higher image quality of the ultrasonic image has arisen in the ultrasonic probe including the ultrasonic transducer array. The total number of the ultrasonic transducer elements used in the ultrasonic probe is increasing so as to raise the number of the lines or channels for the ultrasonic image. However, no suggestion of indicating the testing result is disclosed in JP-A 61-131732. It is likely to take considerable time in order to complete full test of the ultrasonic diagnosis apparatus. No known technique suggests a test of imaging with the ultrasonic transducer array at a higher efficiency and in a short time.

SUMMARY OF THE INVENTION

In view of the foregoing problems, an object of the present invention is to provide an ultrasonic diagnosis system in which operation of an ultrasonic transducer array can be tested correctly and efficiently, and testing method for the same.

In order to achieve the above and other objects and advantages of this invention, an ultrasonic diagnosis system includes an ultrasonic probe, having an ultrasonic transducer array of plural ultrasonic transducer elements, for transmitting an ultrasonic wave to an object, and for receiving an echo signal thereof to output a detection signal. There is a testing unit for test operation of the ultrasonic transducer array by executing a testing mode. Also, there is a display panel. A display control unit controls the display panel to display information of the detection signal obtained for each of the ultrasonic transducer elements when the testing mode is executed.

The information of the detection signal is a signal waveform.

The testing unit has a switching unit, responsive to transmission or reception of the ultrasonic wave or the echo signal, switches one or more ultrasonic transducer elements of a predetermined number to be driven among the ultrasonic transducer elements. At each time that the ultrasonic transducer elements are switched, at least one selected ultrasonic transducer element among the ultrasonic transducer elements is driven.

The testing unit operates in at least first and second testing steps, and when in the first testing step, drives the ultrasonic transducer elements together to obtain the testing detection signal, and when in the second testing step, drives the ultrasonic transducer elements by at least one element to obtain the testing detection signal.

Furthermore, an input device inputs an input signal. The testing unit drives one element of, plural elements of, or any one of the ultrasonic transducer elements in response to the input signal.

The input device repeatedly inputs the input signal, and the ultrasonic transducer elements to be driven are switched.

In one preferred embodiment, the testing unit drives the plural ultrasonic transducer elements by one element or by plural elements at a predetermined interval of time.

When the plural ultrasonic transducer elements are driven by at least one element, the display control unit causes the display panel to continue displaying information of the detection signal of an ultrasonic transducer element among the ultrasonic transducer elements driven before.

The ultrasonic transducer elements are grouped in plural transducer groups, and the display control unit outputs information of the detection signal by changing over for each of the transducer groups.

The information of the detection signal is displayed in an overlapped manner at an end portion where the transducer groups are adjacent with one another.

The display control unit converts strength of the testing detection signal into brightness, and outputs the information of the detection signal in an indicated form of a relationship between the brightness and depth.

In another preferred embodiment, the display control unit outputs the information of the detection signal in an indicated form of a relationship between strength and depth of the testing detection signal.

Furthermore, a comparison unit compares strength of the testing detection signal with a predetermined threshold value. The display control unit controls the display panel according to a comparing result of the testing detection signal, and extracts a portion of a first attack of the testing detection signal initially reflected from the object directly.

The display control unit causes the display panel to indicate the portion of the first attack distinctly from remaining portions thereof.

The display control unit outputs for the first attack portion in a form of at least one of a brilliant point, a wave pattern having an amplitude, and a distinct indicia.

The testing unit includes an incident surface, set to extend substantially in parallel with the array of the ultrasonic transducer elements, opposed to the ultrasonic probe, for constituting the object. A testing reflector is set with an inclination relative to the array, for constituting the object. A moving mechanism shifts the testing reflector to a first position when in a first inspecting step, and shifts the testing reflector to a second position when in a second inspecting step, wherein the testing reflector, when in the first position, is offset from a path from the ultrasonic probe to the incident surface, and when in the second position, is positioned between the ultrasonic probe and the incident surface.

The testing reflector is contained in a testing container, the testing container stores liquid in which a probe end of the ultrasonic probe is submerged. The testing reflector is produced from a material of which a difference in acoustic impedance from the liquid is large, and is opposed to the ultrasonic probe with the liquid.

The incident surface is a lower inner surface of the testing container.

In one preferred embodiment, the incident surface is a surface of an extension of the testing reflector.

Also, a testing method for ultrasonic imaging is provided, and includes a testing step of test operation of plural ultrasonic transducer elements while a testing mode is set, so as to acquire a testing detection signal, wherein the plural ultrasonic transducer elements are arranged in an array, transmit an ultrasonic wave to an object, and receive an echo signal thereof. In an information displaying step, information of the testing detection signal obtained for each of the ultrasonic transducer elements is displayed.

In the testing step, one or more ultrasonic transducer elements of a predetermined number to be driven are switched among the ultrasonic transducer elements in response to transmission or reception of the ultrasonic wave or the echo signal.

The testing step is constituted by at least first and second testing steps, and in the first testing step, the ultrasonic transducer elements are driven together to acquire the testing detection signal, and in the second testing step, the ultrasonic transducer elements are driven by at least one element to acquire the testing detection signal.

In the testing step, one element of, plural elements of, or any one of the ultrasonic transducer elements is driven in response to an input signal from the input device.

In another preferred embodiment, in the testing step, the plural ultrasonic transducer elements are driven by one element or by plural elements at a predetermined interval of time.

The ultrasonic transducer elements are grouped in plural transducer groups, and in the information displaying step, information of the detection signal is displayed by changing over for each of the transducer groups.

In the information displaying step, strength of the testing detection signal is converted into brightness, and the information of the detection signal is displayed in an indicated form of a relationship between the brightness and depth.

In one preferred embodiment, in the information displaying step, the information of the detection signal is displayed in an indicated form of a relationship between strength and depth of the testing detection signal.

The testing step includes comparing strength of the testing detection signal with a predetermined threshold value. A portion of a first attack of the testing detection signal initially reflected from the object directly is extracted according to a comparing result. In the information displaying step, information of the detection signal is displayed according to the comparing result of the testing detection signal.

In the testing step, a testing reflector for reflecting the ultrasonic wave is used, is opposed to the ultrasonic probe, and is disposed with an inclination relative to the array of the ultrasonic transducer elements.

The testing step is constituted by at least first and second inspecting steps, and in the first inspecting step, the testing detection signal is acquired by applying the ultrasonic wave to an incident surface disposed to extend substantially in parallel with the array of the ultrasonic transducer elements, and in the second inspecting step, the ultrasonic wave is applied to the testing reflector.

In addition, a computer executable testing program for ultrasonic imaging is provided, and includes a testing program code for test operation of plural ultrasonic transducer elements while a testing mode is set, so as to acquire a testing detection signal, wherein the plural ultrasonic transducer elements are arranged in an array, transmit an ultrasonic wave to an object, and receive an echo signal thereof. There is an information displaying program code for displaying information of the testing detection signal obtained for each of the ultrasonic transducer elements.

Also, a testing user interface for ultrasonic imaging is provided, and includes a testing region for test operation of plural ultrasonic transducer elements while a testing mode is set, so as to acquire a testing detection signal, wherein the plural ultrasonic transducer elements are arranged in an array, transmit an ultrasonic wave to an object, and receive an echo signal thereof. There is an information displaying region for displaying information of the testing detection signal obtained for each of the ultrasonic transducer elements.

When the plural ultrasonic transducer elements are driven by at least one element, the information displaying region continues displaying information of the detection signal of an ultrasonic transducer element among the ultrasonic transducer elements driven before.

The ultrasonic transducer elements are grouped in plural transducer groups, and the information displaying region displays information of the detection signal by changing over for each of the transducer groups.

The information of the detection signal is displayed in an overlapped manner at an end portion where the transducer groups are adjacent with one another.

The information displaying region, upon converting strength of the testing detection signal into brightness, displays the information of the detection signal in an indicated form of a relationship between the brightness and depth.

In another preferred embodiment, the information displaying region displays the information of the detection signal in an indicated form of a relationship between strength and depth of the testing detection signal.

Furthermore, strength of the testing detection signal is compared with a predetermined threshold value. According to a comparing result of the testing detection signal, a portion of a first attack of the testing detection signal initially reflected from the object directly is extracted. The information displaying region indicates the portion of the first attack distinctly from remaining portions thereof.

The information displaying region displays the first attack portion in a form of at least one of a brilliant point, a wave pattern having an amplitude, and a distinct indicia.

Consequently, operation of an ultrasonic transducer array can be tested correctly and efficiently, owing to the display control for a display panel according to the invention.

BRIEF DESCRIPTION OF THE DRAWINGS

The above objects and advantages of the present invention will become more apparent from the following detailed description when read in connection with the accompanying drawings, in which:

FIG. 3A is an explanatory view in plan, illustrating a screen pattern with waveforms for ultrasonic transducer elements;

FIG. 3B is an explanatory view in plan, illustrating ultrasonic transducer elements of a second transducer group next to a first transducer group;

DETAILED DESCRIPTION OF THE PREFERRED EMBODIMENT(S) OF THE PRESENT INVENTION

Figure 1:
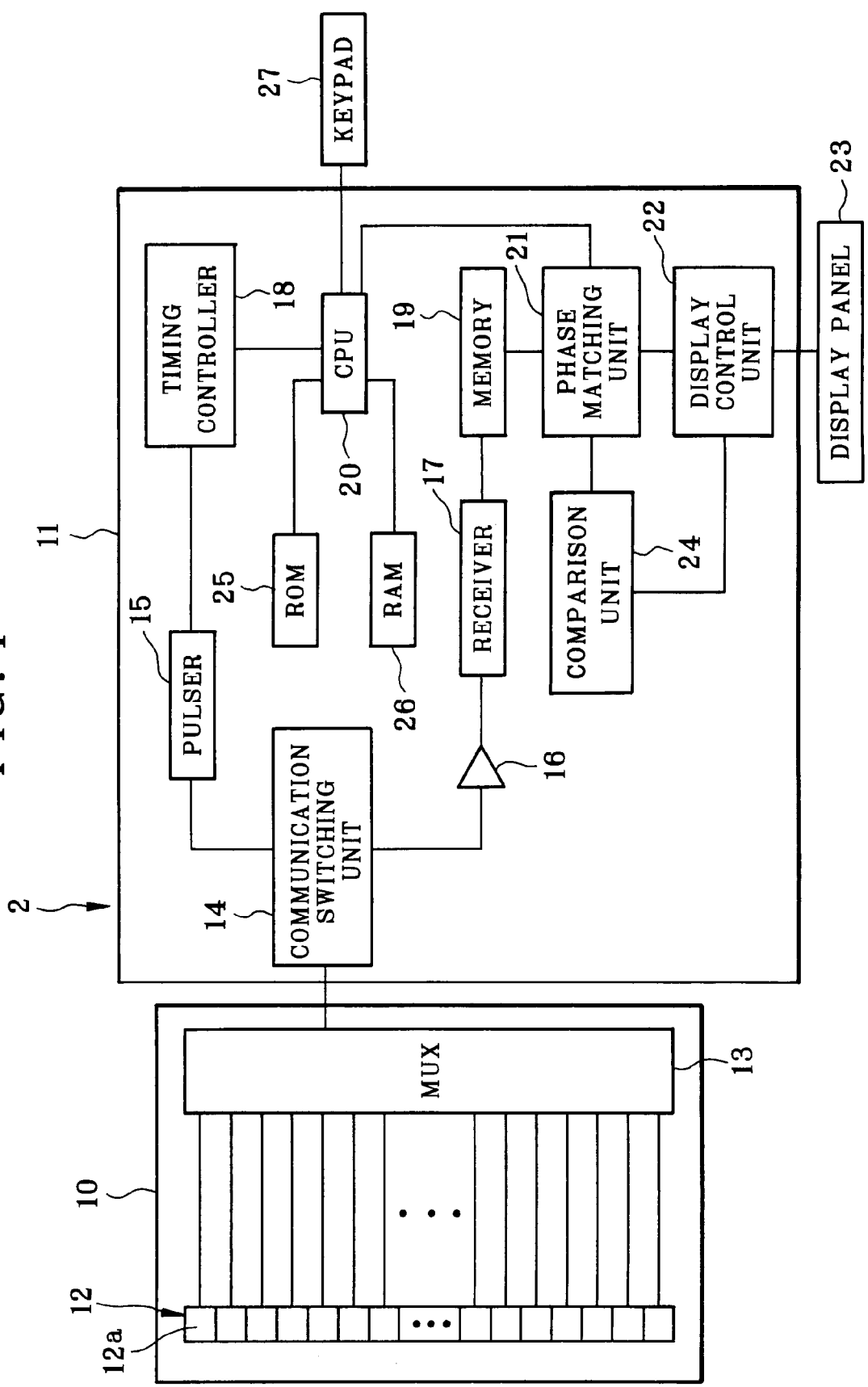
FIG. 1 is a block diagram illustrating an ultrasonic diagnosis system.
Figure 2A:
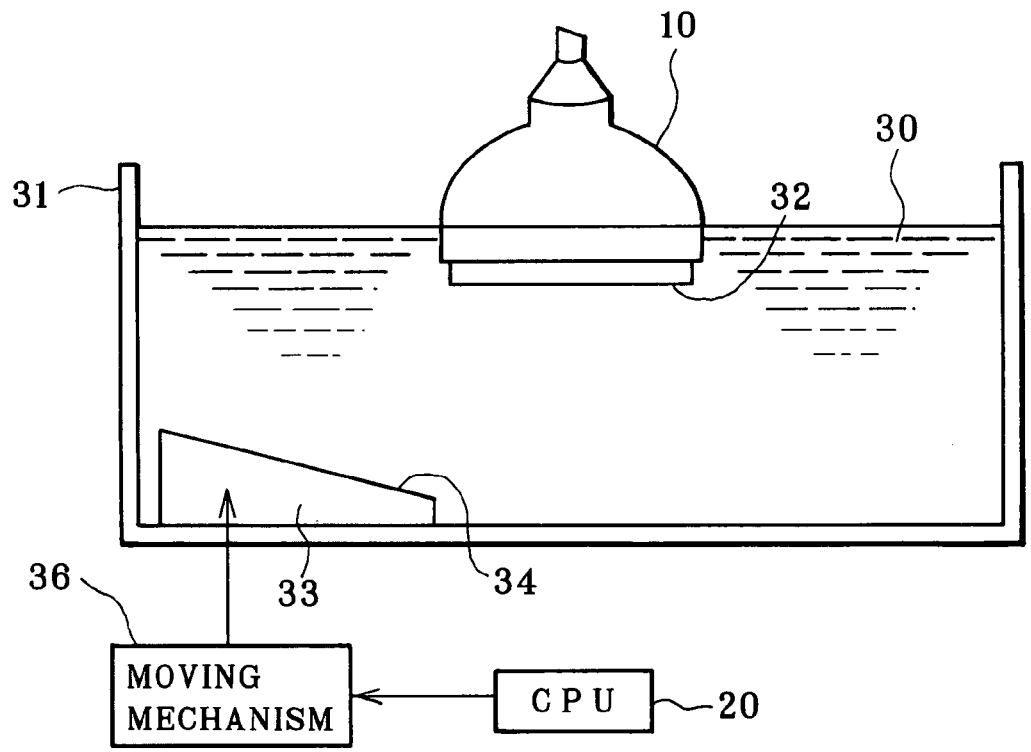
FIG. 2A is an explanatory view illustrating an ultrasonic probe, a testing container and a testing reflector.
Figure 2B:
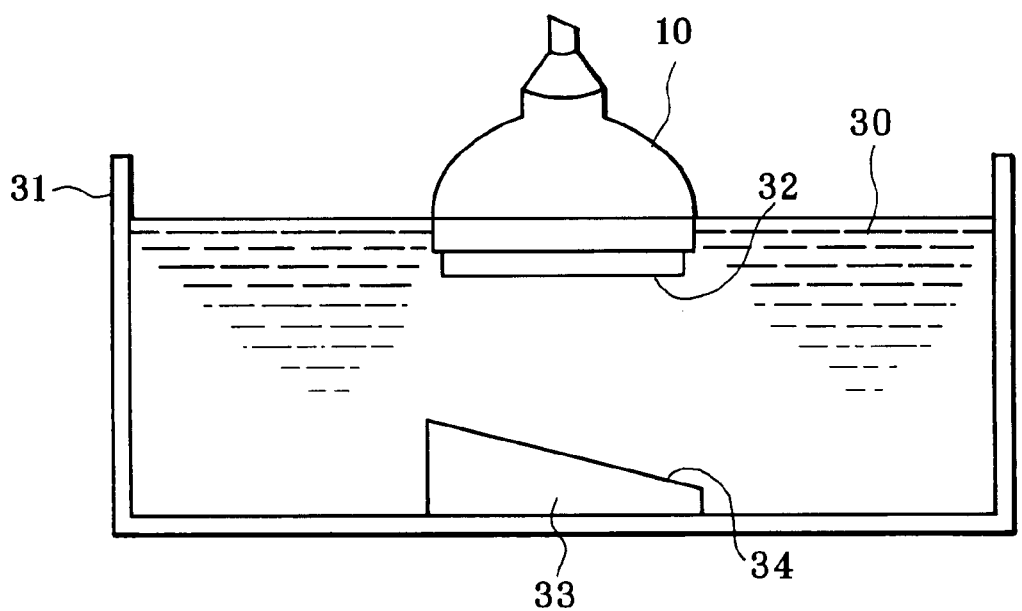
FIG. 2B is an explanatory view illustrating the same as FIG. 2A but in which the testing reflector is opposed to the ultrasonic probe.

In FIG. 1, an ultrasonic diagnosis system 2 is constituted by an ultrasonic probe 10 and a signal processor 11 with a testing unit. The ultrasonic probe 10 is a type of an extracorporeal diagnostic type of linear electronic scanning. In FIGS. 2A and 2B, 128 ultrasonic transducer elements 12a as ultrasonic oscillators are arranged in one direction as an ultrasonic transducer array 12 as ultrasonic oscillator array.

Each of the ultrasonic transducer elements 12a includes a piezoelectric thick film and two electrodes, the piezoelectric thick film being formed from such materials as lead titanate zirconate (PZT), polyvinylidene fluoride (PVDF), the electrodes being attached to two surfaces of the piezoelectric thick film. When voltage is applied to the electrodes, the piezoelectric thick film oscillates to generate an ultrasonic wave, which is applied to tissue or lesion of a human body as object, through a body surface or skin surface, either extracorporeal surface or intraluminal surface. An MUX or multiplexer 13, as switching unit in a testing unit, drives the ultrasonic transducer elements 12a in a serial manner to apply ultrasonic wave to an object or lesion to scan. When an echo signal is received by the object, the piezoelectric thick film oscillates to generate voltage, which is an output or detection signal.

The multiplexer 13 designates eight (8) adjacent elements among 128 ultrasonic transducer elements 12a and drives those simultaneously for transmitting an ultrasonic wave and receiving an echo signal. Also, the multiplexer 13 switches and shifts the designation of the selected adjacent elements to be driven for the transmission and reception by a predetermined number which may be an integer of at least one. Also, a keypad 27 as input device in a user interface of a testing unit is connected for inputting an instruction signal. In a testing mode described later, the multiplexer 13 responds to the instruction signal drives the ultrasonic transducer elements 12a by a predetermined number which may be one or more. Also, the multiplexer 13 can drive the ultrasonic transducer array 12 periodically at an interval of time in an automated manner.

A communication switching unit 14 in the signal processor 11 is connected with the multiplexer 13. The communication switching unit 14 changes over transmission and reception periodically at a predetermined interval for an ultrasonic wave and an echo signal of the ultrasonic transducer elements 12a.

A pulser 15 is connected with the communication switching unit 14. There is an amplifier 16 by which a receiver 17 is connected with the communication switching unit 14. The pulser 15 sends an excitation pulse to the communication switching unit 14 for producing an ultrasonic wave. The amplifier 16 amplifies a detection signal from the communication switching unit 14 at a predetermined ratio of amplification. The receiver 17 receives the amplified detection signal from the amplifier 16. Note that the numbers of the communication switching unit 14, the pulser 15, the amplifier 16 and the receiver 17, despite a simplified depiction in the drawing, are as high as the number of selected ones of the ultrasonic transducer elements 12a driven simultaneously by the multiplexer 13.

A timing controller 18 is connected with the pulser 15. A memory 19 is connected with the receiver 17. A CPU 20 as a testing unit controls the timing controller 18, which outputs an excitation signal to the pulser 15 for generating an excitation pulse. The memory 19 provisionally stores a plurality of detection signals obtained by ultrasonic scanning of the ultrasonic transducer array 12 at one time.

A phase matching unit 21 is connected with the memory 19. The phase matching unit 21 responds to timing information determined by the CPU 20, and reads plural detection signals from the memory 19. The phase matching unit 21 matches the phase of the plural detection signals by setting a delay according to a time difference in the transmission and reception, and then adds up the detection signals after the phase matching.

A display control unit 22 for a user interface is supplied with the detection signal after the phase matching and addition in the phase matching unit 21. The display control unit 22 subjects the detection signal to image processing of various conditions, and converts the detection signal into data of a television signal of a scanning of NTSC system. A display panel 23 with an information display region converts the data of the NTSC system from the display control unit 22 into an analog signal, according to which an ultrasonic image is displayed.

A comparison unit 24 is connected with the phase matching unit 21. While the testing mode is set, the comparison unit 24 operates. For plural detection signals, the comparison unit 24 compares their strength with a predetermined threshold value, and outputs a result of the comparison and sends it to the display control unit 22. Various tools are used for the test, including a testing container 31 with an incident surface, and a testing reflector 33 in FIGS. 2A and 2B. The threshold value is predetermined for acquiring information of a portion of a first attack of the detection signal reflected at first by any one of a lower inner surface of the testing container 31, and a reflection surface 34 of the testing reflector 33.

A ROM 25 and RAM 26 are connected with the CPU 20 as well as the keypad 27. The ROM 25 stores programs and data required for operating the ultrasonic diagnosis system 2. Also, a testing program is stored in the ROM 25 for testing the ultrasonic transducer array 12 in a testing mode. The CPU 20 reads the programs and data from the ROM 25 and temporarily writes those to the RAM 26 to control various elements in the ultrasonic diagnosis system 2.

The keypad 27 constitutes the user interface which may include a keyboard, mouse, track ball, touch panel or other devices. The keypad 27 is operated to execute the testing mode by startup of a testing program, or to drive one or more of the ultrasonic transducer elements 12*a* manually in the testing mode. The CPU 20 responds to an input signal from the keypad 27, and controls various elements in the ultrasonic diagnosis system 2.

Diagnosis by use of the ultrasonic diagnosis system 2 is described now. Ultrasonic gel is applied to a surface of a human body. A probe surface 32 where the ultrasonic transducer array 12 is positioned as illustrated in FIGS. 2A and 2B is moved to contact the surface of the human body with the ultrasonic gel. An ultrasonic image is obtained percutaneously according to detection in the ultrasonic transducer array 12, is displayed on the display panel 23 and is observed by a user. The multiplexer 13 is controlled by the CPU 20 in the ultrasonic diagnosis system 2 to designate selected ones of the ultrasonic transducer elements 12*a* to be driven. An excitation signal is generated by the timing controller 18, to cause the pulser 15 to generate an excitation pulse.

The excitation pulse from the pulser 15 is passed through the communication switching unit 14 and the multiplexer 13 and transmitted to the ultrasonic transducer elements 12*a*. The ultrasonic transducer elements 12*a* oscillate in response to the excitation pulse. Selectively designated ones of the ultrasonic transducer elements 12*a* is caused by the multiplexer 13 to emit an ultrasonic wave to tissue of the human body as object.

After application of the ultrasonic wave, an echo signal from the object is received by the ultrasonic transducer elements 12*a*, which output a detection signal. The detection signal is passed through the multiplexer 13 and the communication switching unit 14, is amplified by the amplifier 16 and received by the receiver 17. After completion of transmission and reception of one time of the excitation pulse and detection signal, the ultrasonic transducer elements 12*a* to be driven are switched with a shift, before the same processing described above. Ultrasonic wave is applied for scanning to the object.

Plural detection signals obtained by ultrasonic scanning at one time are stored in the memory 19 provisionally, and then read by the phase matching unit 21 at determined timing of the CPU 20. Then the detection signals are subjected to phase matching and addition. After this, an output signal from the phase matching unit 21 is processed in image processing by the display control unit 22, is converted according to the NTSC system. So an analog signal is output to display an ultrasonic image on the display panel 23.

The operation of testing of the ultrasonic diagnosis system 2 in the testing mode is described next. An engineer of a dealer or other suitable operator recommended by a system manufacturer starts up the testing mode at a suitable time, for example, before shipment of the ultrasonic diagnosis system 2, shortly after its installation, or periodically in use after the installation.

In FIGS. 2A and 2B, testing in the testing mode is illustrated. The testing container 31 is used. Water or liquid 30 is stored in the testing container 31. A lower inner surface of the testing container 31 is oriented horizontal. The probe surface 32 of the ultrasonic probe 10 is set horizontal, namely parallel with the lower inner surface of the testing container 31. Thus, a probe end of the ultrasonic probe 10 is submerged in the water 30 and kept positioned.

The testing reflector 33 is positioned on a lower inner surface of the testing container 31 and formed from a material of which a difference in the acoustic impedance from the water 30 is large, for example aluminum, stainless steel, acrylic resin and the like. The reflection surface 34 of the testing reflector 33 is inclined to decrease the distance to the probe surface 32. A moving mechanism 36 in the testing unit keeps the testing reflector 33 movable on the lower inner surface of the testing container 31 between a position of FIG. 2A offset from the probe surface 32 and a position of FIG. 2B opposed to the probe surface 32. For reference, numerals of 1-128 are used to designate the ultrasonic transducer elements 12*a* in the sequence from the left to the right.

At first, the testing program is run by operating the keypad 27 to set the testing mode. A first inspection is conducted. The testing reflector 33 is positioned as illustrated in FIG. 2A for ultrasonic transmission and reception of one time with the ultrasonic transducer elements 12*a*. An ultrasonic wave propagates in the water 30, is reflected by the lower inner surface of the testing container 31, and received by the ultrasonic transducer array 12 as an echo signal.

A detection signal is output by the ultrasonic transducer elements 12*a* upon reception of the echo signal, is amplified by the amplifier 16, is received by the receiver 17, and is written to the memory 19. A plurality of detection signals are obtained at one time of ultrasonic scanning and stored in the memory 19. Those detection signals are subjected to phase matching, and are added up. The detection signal after the phase matching and addition in the phase matching unit 21 is sent to the display control unit 22. The strength of the plural detection signals is compared with the threshold value by the comparison unit 24, to obtain a portion of the first attack of the detection signal. A result of the comparison, inclusive of the first attack information, is output and sent to the display control unit 22.

The display control unit 22 produces image data of an image of the B scan mode (brightness scan mode), namely in a form of a relationship between brightness and depth after conversion of the strength of the detection signal from the phase matching unit 21 into the brightness. In FIGS. 3A and 3B, a plurality of signal waveforms 40 as detection signal are displayed on the display panel 23 as images of the B scan mode in association with respectively the ultrasonic transducer elements 12*a*.

The signal waveforms 40 are a form to indicate a strength of the detection signal by a brilliant line. A vertical direction of the signal waveforms 40 is set as a depth direction of the testing container 31 or depth direction of an ultrasonic beam. A brilliant point 41 as testing result is indicated on the signal waveforms 40 only in the position of detecting an echo signal. The brilliant point 41 is a portion of an echo signal which is detected as a first attack by the comparison unit 24 and having been initially reflected by a lower inner surface of the testing container 31. If the reception of the ultrasonic transducer elements 12*a* is normal, the brilliant point 41 appears on the signal waveforms 40 in a constantly equal position. In this first inspection, existence or lack of the brilliant point 41, and its density and indicated position are observed so that it is possible to check irregularity in the sensitivity of the ultrasonic transducer elements 12*a*, failure in the reception, possible disconnection of wiring and the like.

In FIG. 3A, the display panel 23 displays the signal waveforms 40 at first for Nos. 1-64 of the ultrasonic transducer elements 12*a*. A NEXT button 42 is indicated at a corner of the display panel 23. When a user sets and clicks a cursor 43 as input device at the NEXT button 42, then the display panel 23 changes over to display the signal waveforms 40 for Nos.

65-128 of the ultrasonic transducer elements 12a. When a user sets and clicks the cursor 43 as input device at a BACK button 44 of FIG. 3B, then the display panel 23 changes over from FIG. 3B to the state of FIG. 3A.

Then a second inspection is made. The testing reflector 33 is kept positioned as illustrated in FIG. 2A. The ultrasonic transducer elements 12a are driven by one element one after another either by operation of the RAM 26 or automatically by the multiplexer 13 at a predetermined interval of time. The display panel 23 displays the signal waveforms 40 at each time of driving one of the ultrasonic transducer elements 12a in a manner similar to the first inspection. However, the display panel 23 continues displaying a former shape of the signal waveforms 40 of at least one of the ultrasonic transducer elements 12a which may be earlier than the present element by a small number.

In the first inspection, eight of the ultrasonic transducer elements 12a are driven simultaneously to check failure in the reception. However, it is impossible to check failure in the transmission of each of the ultrasonic transducer elements 12a. In contrast, in the second inspection, the ultrasonic transducer elements 12a are driven by a single element. It is possible to check failure in the transmission of the ultrasonic transducer elements 12a, short-circuiting or possible disconnection of wiring, by observing existence or lack of the brilliant point 41, and its density and indicated position. Note that it is specifically preferable to receive an echo signal at two adjacent elements among the ultrasonic transducer elements 12a so as to display two of the signal waveforms 40 on the display panel 23. This ensures the test with precision because of the higher number of samples of the test.

Figure 4:
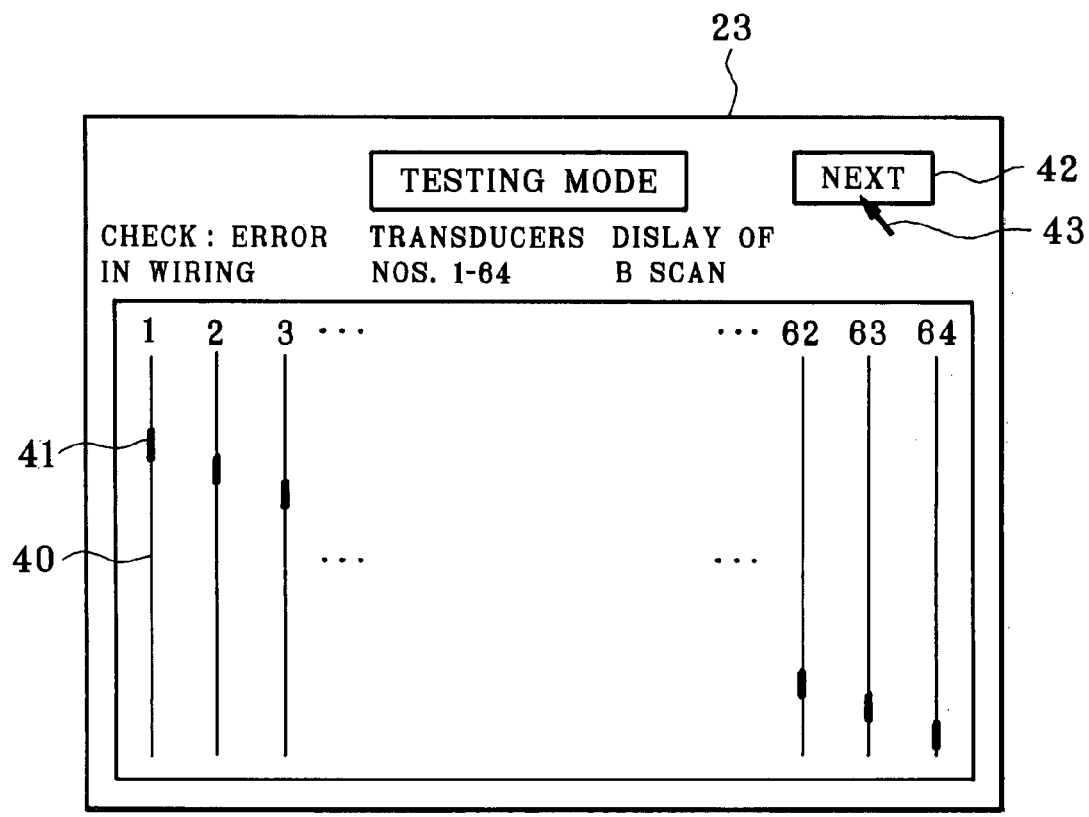
FIG. 4 is an explanatory view in plan, illustrating a screen pattern in which brilliant points are indicated with signal waveforms.

Then the testing reflector 33 is moved to the position of FIG. 2B by the moving mechanism 36 to position the testing reflector 33 to face the probe surface 32. A third inspection is conducted by driving the ultrasonic transducer elements 12a are driven one after another in the same manner as the second inspection. In FIG. 4, the signal waveforms 40 are indicated together with the brilliant point 41 which exactly expresses information of an echo signal reflected at first by the reflection surface 34 directly.

If there is an error in the connection between the ultrasonic transducer elements 12a according adjacent two of them, the brilliant point 41 of a left one of the signal waveforms 40 is displayed and positioned higher than the brilliant point 41 of a right one of the signal waveforms 40. Accordingly, it is possible in the third inspection to check wrong wiring of the ultrasonic transducer elements 12a by observing the indicated position of the brilliant point 41 and its existence or lack.

Consequently, the operation of the ultrasonic transducer elements 12a can be tested together with one another because a plurality of the signal waveforms 40 of respectively the ultrasonic transducer elements 12a are displayed on the display panel 23 in combination.

Also, grouping of the ultrasonic transducer elements 12a into two transducer groups of Nos. 1-64 and Nos. 65-128 is advantageous because the test can be efficiently conducted irrespective of the large number of the ultrasonic transducer elements 12a. Also, the comparison unit 24 extracts the first attack portion of the detection signal to display the signal waveforms 40 with the result of the comparison. The brilliant point 41 can be displayed sufficiently without surplus indication unnecessary for the test.

Figure 5:
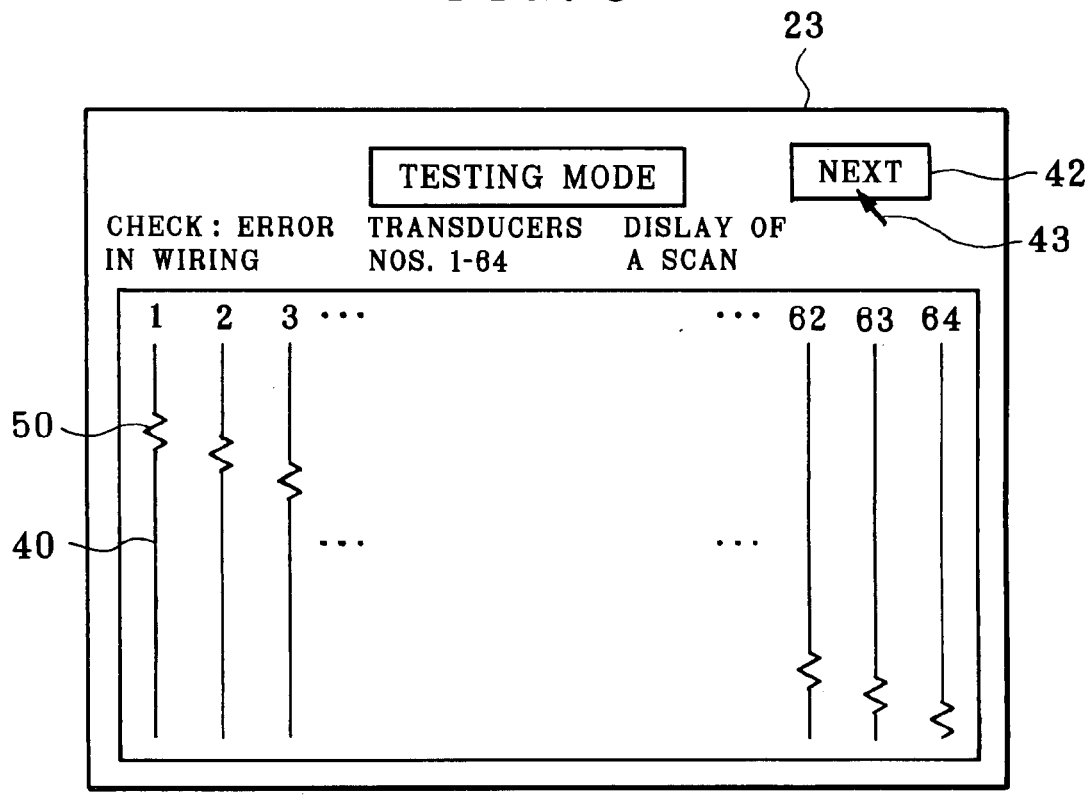
FIG. 5 is an explanatory view in plan, illustrating a screen pattern in which wave patterns are indicated with signal waveforms.

In the above embodiment, the user interface operates in the B scan mode for display of the testing result. However, the A scan mode (amplitude scan mode) of FIG. 5 may be used in the user interface for displaying a relationship between the strength and depth of the detection signal as a form of the testing result. The signal waveforms 40 appear as information of the detection signal itself. A wave pattern 50 having an amplitude is indicated as a portion of the brilliant point 41 of the above embodiment.

Figure 6:
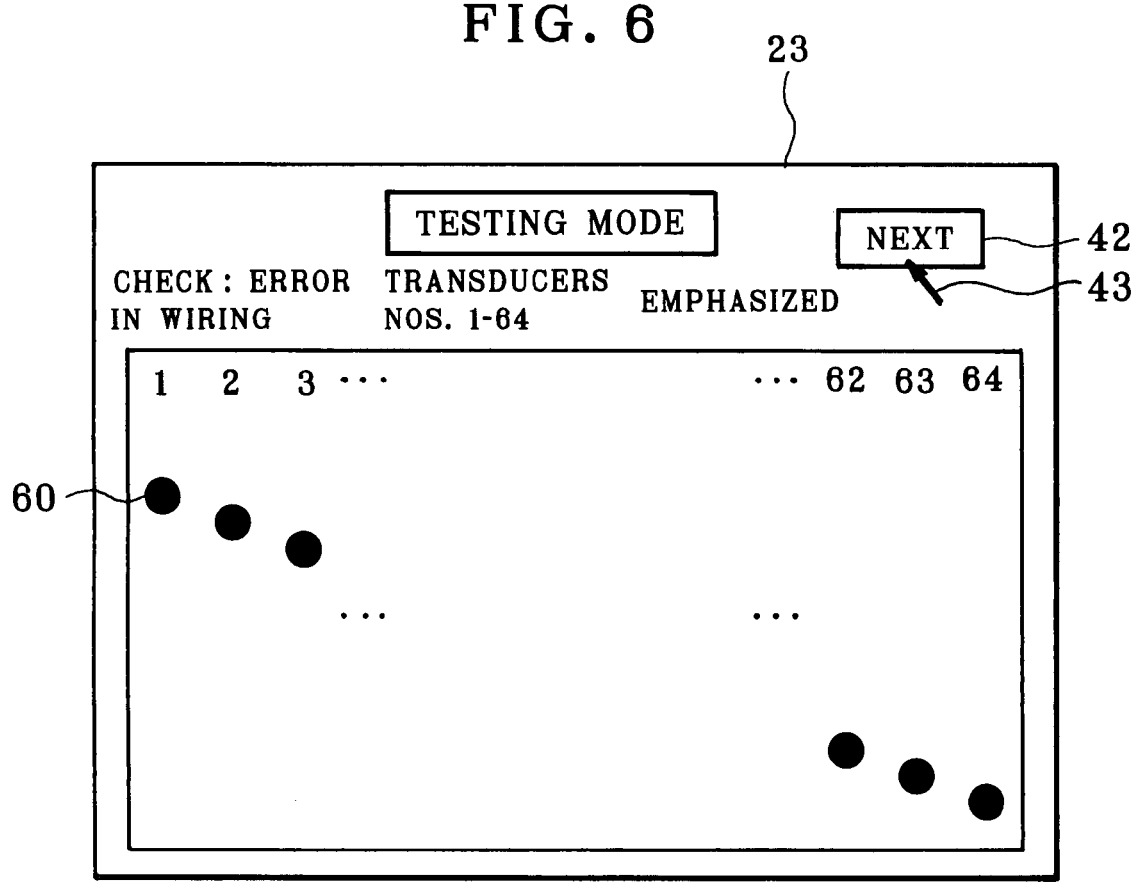
FIG. 6 is an explanatory view in plan, illustrating a screen pattern similar to FIGS. 4 and 5 but with distinct indicia.

In FIG. 6, an example with a distinct indicia 60 with an emphasis for a first attack is illustrated. The distinct indicia 60 of a circular shape can be displayed in place of the signal waveforms 40 or in addition to the signal waveforms 40 according to the output of the comparison unit 24. The indication can be recognized apparently.

Figure 7:
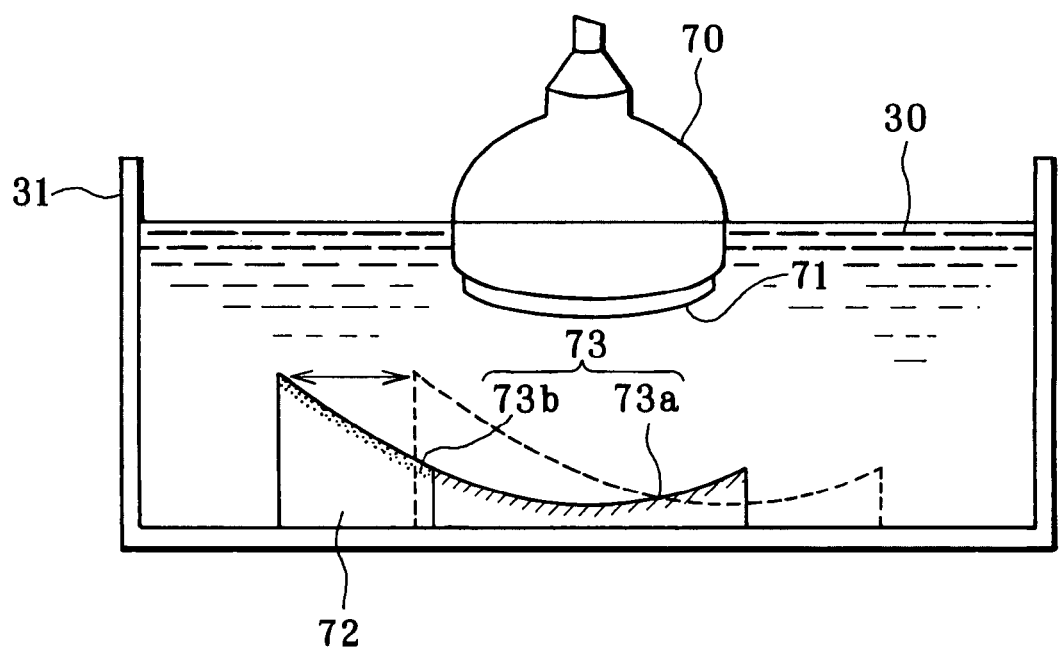
FIG. 7 is an explanatory view illustrating one preferred embodiment in which an ultrasonic probe has a convex probe surface, a testing reflector is curved.

In FIG. 7, another preferred ultrasonic probe 70 is illustrated. Unlike the linear electronic scanning type of the ultrasonic probe 10, the ultrasonic probe 70 is a convex electronic scanning type as a probe surface 71 is convex. A testing reflector 72 is used for testing the ultrasonic probe 70. In order to conduct the first, second and third inspections, a reflection surface 73 includes a first reflection surface 73a and a second reflection surface 73b as an inclined portion. The first reflection surface 73a as an incident surface is curved concavely in consideration of the shape of the probe surface 71. The second reflection surface 73b is inclined to decrease the distance to the probe surface 71. At the time of the first and second inspections, the testing reflector 72 is positioned as indicated by the solid line to oppose the first reflection surface 73a to the probe surface 71 directly. At the time of the third inspection, the testing reflector 72 is positioned as indicated by the broken line to oppose the second reflection surface 73b to the probe surface 71 in a form with a decrease of the distance to the probe surface 71.

In the above embodiment, the grouping of the displayed testing results according to the ultrasonic transducer elements 12a has been described. Furthermore, ends of the plural transducer groups can be overlapped on one another. In other words, displayed waveforms of a first transducer group have a first end from which the second transducer group starts. For the second transducer group, its waveforms can be displayed in combination with the first end which can appear again even after the changeover. It is to be noted that, in the third inspection, the indicated position of the brilliant point 41 or the wave pattern 50 may be converted into information of a numerical value which can be displayed. Also, a portion of the brilliant point 41 or the wave pattern 50 may be enlarged and displayed.

Furthermore, image recognition can be used for processing the signal waveforms 40 in addition to the manual inspection, or in place of the same. A result of the image recognition may be analyzed to designate a failing one of the ultrasonic transducer elements 12a. One of the signal waveforms 40 can be indicated by the specifying the failing one of the ultrasonic transducer elements 12a.

Note that the features of the above embodiments are only examples and not limited in the invention, including the number of the ultrasonic transducer elements 12a being arranged, the number of simultaneously driven elements among the ultrasonic transducer elements 12a, and a sequence of the first, second and third inspections. Also, all the ultrasonic transducer elements 12a may be driven for the inspections typically if the number of the ultrasonic transducer elements 12a is small. Also, an ultrasonic wave may be generated by plural elements in the ultrasonic transducer elements 12a and a single one of those can receive an echo signal from the plural elements.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An ultrasonic diagnosis system comprising:
an ultrasonic probe, having an ultrasonic transducer array of plural ultrasonic transducer elements, for transmitting an ultrasonic wave to an object, and for receiving an echo signal thereof to output a detection signal;
a testing unit for test operation of said ultrasonic transducer array by executing a testing mode;
a display panel;
a display control unit for controlling said display panel to display information of said detection signal obtained for each of said ultrasonic transducer elements when said testing mode is executed and
wherein said testing unit has a switching unit, responsive to transmission or reception of said ultrasonic wave or said echo signal, for switching one or more ultrasonic transducer elements of a predetermined number to be driven among said ultrasonic transducer elements, and at each time that said ultrasonic transducer elements are switched, one or plural selected ultrasonic transducer elements among said ultrasonic transducer elements is driven.

2. An ultrasonic diagnosis system as defined in claim 1, wherein said information of said detection signal is a signal waveform.

3. An ultrasonic diagnosis system as defined in claim 1, wherein said testing unit in said testing mode operates in at least first and second tests, and when in said first test, drives said ultrasonic transducer elements together at one time to obtain said detection signal, and when in said second test, drives said ultrasonic transducer elements by one or plural elements to obtain said detection signal.

4. An ultrasonic diagnosis system as defined in claim 1, further comprising an input device for inputting an input signal;
wherein said testing unit drives said ultrasonic transducer elements by one or plural elements in response to said input signal, and/or drives said ultrasonic transducer elements simultaneously in response to said input signal.

5. An ultrasonic diagnosis system as defined in claim 1, wherein said testing unit drives said ultrasonic transducer elements by one or plural elements periodically, and/or drives said ultrasonic transducer elements simultaneously.

6. An ultrasonic diagnosis system as defined in claim 5, wherein when said plural ultrasonic transducer elements are driven by at least one element, said display control unit causes said display panel to continue displaying said information of said detection signal of an ultrasonic transducer element among said ultrasonic transducer elements driven before.

7. An ultrasonic diagnosis system as defined in claim 1, wherein said ultrasonic transducer elements are grouped in plural transducer groups, and said display control unit outputs said information of said detection signal by changing over for each of said transducer groups.

8. An ultrasonic diagnosis system as defined in claim 7, wherein said information of said detection signal is displayed in an overlapped manner at an end portion where said transducer groups are adjacent with one another.

9. An ultrasonic diagnosis system as defined in claim 1, wherein said display control unit converts strength of said detection signal into brightness, and outputs said information of said detection signal in an indicated form of a relationship between said brightness and depth in a B scan mode.

10. An ultrasonic diagnosis system as defined in claim 1, wherein said display control unit outputs said information of said detection signal in an indicated form of a relationship between strength and depth of said detection signal in an A scan mode.

11. An ultrasonic diagnosis system as defined in claim 1, further comprising a comparison unit for comparing strength of said detection signal with a threshold value so predetermined as to extract a portion of a first attack of said detection signal initially reflected from said object directly;
wherein said display control unit controls said display panel according to a comparing result of said detection signal.

12. An ultrasonic diagnosis system as defined in claim 11, wherein said display control unit causes said display panel to indicate said portion of said first attack distinctly from remaining portions thereof.

13. An ultrasonic diagnosis system as defined in claim 12, wherein said display control unit outputs for said first attack portion in a form of at least one of a brilliant point, a wave pattern, and a distinct indicia.

14. An ultrasonic diagnosis system as defined in claim 1, wherein said testing unit includes a testing reflector, having a reflection surface, disposed to face a probe surface of said ultrasonic transducer elements with a decrease in a distance to said probe surface from a first end to a second end thereof;
wherein a testing container is used and stores liquid in which said testing reflector is positioned to submerge a probe end of said ultrasonic probe.

15. A testing method for ultrasonic imaging, comprising:
a testing step of test operation of an ultrasonic transducer array by executing a testing mode, wherein said ultrasonic transducer array includes plural ultrasonic transducer elements for transmitting an ultrasonic wave to an object and for receiving an echo signal thereof;
an information displaying step of, when said testing mode is executed, displaying information of said detection signal obtained for each of said ultrasonic transducer elements on a display panel, and
wherein in said testing step, one or more ultrasonic transducer elements of a predetermined number to be driven are switched among said ultrasonic transducer elements in response to transmission or reception of said ultrasonic wave or said echo signal.

16. A testing method as defined in claim 15, wherein said information of said detection signal is a signal waveform.

17. A testing method as defined in claim 16, wherein said testing step is constituted by at least first and second testing steps, and in said first testing step, said ultrasonic transducer elements are driven together at one time to acquire said detection signal, and in said second testing step, said ultrasonic transducer elements are driven by one or plural elements to acquire said detection signal.

18. A testing method as defined in claim 17, wherein in said testing step, said ultrasonic transducer elements are driven by one or plural elements in response to an input signal, and/or are driven simultaneously in response to an input signal.

19. A testing method as defined in claim 17, wherein in said testing step, said ultrasonic transducer elements are driven by one or plural elements periodically, and/or are driven simultaneously.

20. A testing method as defined in claim 17, wherein when said plural ultrasonic transducer elements are driven by at least one element, said display panel in said information displaying step continues displaying said information of said detection signal of an ultrasonic transducer element among said ultrasonic transducer elements driven before.

21. A testing method as defined in claim 17, wherein said ultrasonic transducer elements are grouped in plural transducer groups, and in said information displaying step, said information of said detection signal is output by changing over for each of said transducer groups.

22. A testing method as defined in claim 17, wherein in said information displaying step, strength of said detection signal is converted into brightness, and said information of said detection signal is displayed in an indicated form of a relationship between said brightness and depth in a B scan mode.

23. A testing method as defined in claim 17, wherein in said information displaying step, said information of said detection signal is displayed in an indicated form of a relationship between strength and depth of said detection signal in an A scan mode.

24. A testing method as defined in claim 17, further comprising a comparing step of comparing strength of said detection signal with a threshold value so predetermined as to extract a portion of a first attack of said detection signal initially reflected from said object directly; in said information displaying step, said information of said detection signal is displayed according to a comparing result of said comparing step.

25. A testing method as defined in claim 17, wherein in said information displaying step, said portion of said first attack is indicated distinctly from remaining portions.

26. A testing method as defined in claim 17, wherein in said testing step, a testing reflector is used, and has a reflection surface, disposed to face a probe surface of said ultrasonic transducer elements with a decrease in a distance to said probe surface from a first end to a second end thereof.

27. A testing method as defined in claim 26, wherein said testing step is constituted by at least first and second inspecting steps, and in said first inspecting step, said detection signal is acquired by applying said ultrasonic wave to an incident surface disposed to extend substantially by following said probe surface of said ultrasonic transducer elements in opposing said ultrasonic transducer array to said incident surface, and in said second inspecting step, said ultrasonic wave is applied to said testing reflector in opposing said ultrasonic transducer array to said testing reflector.

* * * * *